United States Patent [19]

Yamamoto et al.

[11] Patent Number: 4,949,118
[45] Date of Patent: Aug. 14, 1990

[54] INDICATING APPARATUS WITHIN FINDER OF SINGLE-LENS REFLEX CAMERA

[75] Inventors: Masato Yamamoto; Masahiro Nakajima; Toshimasa Yamanaka, all of Tokyo, Japan

[73] Assignee: Asahi Kogaku Kogyo K.K., Tokyo, Japan

[21] Appl. No.: 287,032

[22] Filed: Dec. 21, 1988

[30] Foreign Application Priority Data

Dec. 28, 1987 [JP] Japan .................. 62-332905

[51] Int. Cl.$^5$ .......................................... G03B 17/18
[52] U.S. Cl. .................................................. 354/475
[58] Field of Search ........ 354/409, 465, 466, 471–475, 354/289.1, 289.12, 200, 201, 219, 224, 225, 155; 352/171

[56] References Cited

U.S. PATENT DOCUMENTS 4,367,463  1/1983  Suzuki et al. .................. 354/471
4,750,014  6/1988  Frank .............................. 354/471

OTHER PUBLICATIONS

Pentax Brochure for camera Model MEF, dated Nov. 1981.
Pentax Brochure for camera model SFX, dated Mar. 1987.

Primary Examiner—L. T. Hix
Assistant Examiner—David M. Gray
Attorney, Agent, or Firm—Sandler, Greenblum & Bernstein

[57] ABSTRACT

A single-lens reflex camera has a finder device in which rays of light of an object to be photographed are reflected by a mirror to form an image of the object on a focusing glass, an information indicating apparatus within the finder device which can project photographing information represented by a letter or a figure or other symbol onto the focusing glass, an indication control circuit which controls the information to be indicated in the information indicating apparatus, and an information indicating switch for turning the information projector ON and OFF.

16 Claims, 4 Drawing Sheets

INDICATING APPARATUS WITHIN FINDER OF SINGLE-LENS REFLEX CAMERA

BACKGROUND OF THE INVENTION

1. Field of the Invention

The present invention relates to an apparatus for displaying various photographing information, such the selection of automatic and manual operations, and shutter speed within a finder in a single-lens reflex camera.

2. Description of Related Art

Usually, in a single-lens reflex camera, exposure information, such as proper exposure, shutter speed, diaphragm value (F value), etc. and photographing information, such as in-focus, out-of focus or the like are indicated in the finder. However, since this information is located on the peripheral portion of the finder field of view, it is necessary for a photographer to move his or her eyes in order to see the information.

In a single-lens reflex camera having an auto focus device, a strobe device, or a plurality of programmed shutters for an object to be photographed which moves at a high speed and for an object which is kept still etc., all information thereon must be indicated within the finder. However, it is practically impossible to indicate all of the information within the finder field of view. This is the reason that an additional indicator, such as a liquid crystal display is provided on the outer surface of the camera body in a conventional single-lens reflex camera.

However, a photographer can not see the information shown in the indicator additional when looking through the finder. Accordingly, in order to see the information in the additional indicator, it is necessary for the photographer to move his or her eyes away from the finder. This ins not only troublesome but may also result in a missed picture.

SUMMARY OF THE INVENTION

The primary object of the present invention is to provide an indicating apparatus which can indicate the necessary information, such as shutter speed, diaphragm value, etc. in the center of the finder field of view.

To achieve the object mentioned above, according to the present invention, a single-lens reflex camera has a finder device in which rays of light of the object to be photographed, are reflected by a mirror to form an image of the object on a focusing glass which comprises an information projector which can project photographing information represented by a letter or a figure or the like onto the focusing glass, and an indication control circuit which controls the information to be indicated in the information projector, with means for switching the information projector ON and OFF.

The information projector of the preferred embodiment comprises for example, a light source, a transmission type liquid crystal substrate located in front of the light source, and an imaging lens located in front of the liquid crystal substrate. The information projector is arranged on a side wall of a mirror box opposite to the mirror, so that the information projected by the information projector can be reflected by the mirror to form an image of the information on the focusing glass. In another embodiment, the information projector is located on the rear face of a mirror (the bottom of a camera body) which has a half mirror portion, so that the information image projected by the information projector is transmitted through the half mirror to be focused on the focusing glass.

BRIEF DESCRIPTION OF DRAWINGS

The invention will be described below in detail with reference to the accompanying drawings, in which.

DETAILED DESCRIPTION OF EMBODIMENTS

Figure 1:
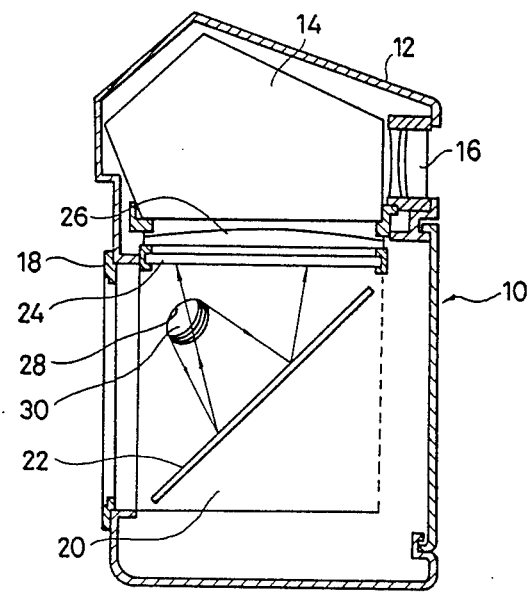
FIG. 1 is a longitudinal sectional view of a main part of a camera body of a single-lens reflex camera, according to an embodiment of the present invention.
Figure 2:
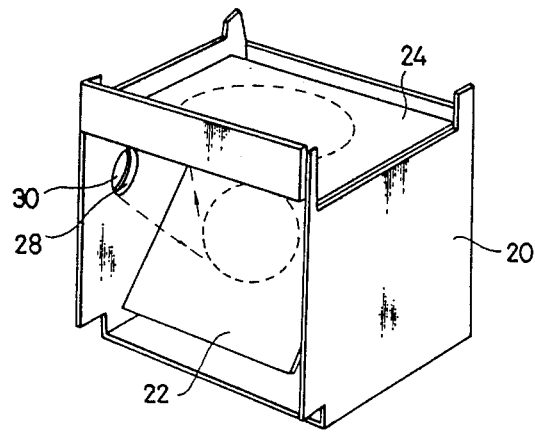
FIG. 2 is a perspective view of a mirror box shown in FIG. 1.

In the illustrated embodiment, a camera body 10 has a pentagonal housing 12 with a pentagonal prism 14 and an eye piece 16.

Camera body 10 is provided with a mirror box 20 which has therein a movable mirror 22. The mirror movable 22 is in the form of a quick return mirror which is sprung prior to the shutter operation and is returned to its initial position when the shutter operation is completed, as is well known.

A focusing glass or focusing screen 24 is mounted at the top of the mirror box 20. A condenser lens 26 is positioned between the focusing glass 24 and the pentagonal prism 14.

The flux of light which is incident upon an interchangeable lens (not shown) mounted to a lens mount 18 from an object to be photographed is reflected by the mirror 22 and is then imaged onto the focusing glass 24 which is located at a position equivalent to a film plane, as is well known. The image formed on the focusing glass 24 can be seen by a photographer through the condenser lens 26, the pentagonal prism 14 and the eye piece 16.

The arrangement described above is similar to that of a conventional single-lens reflex camera.

The following discussion will be mainly directed to the features of the present invention.

Figures 3, 4:
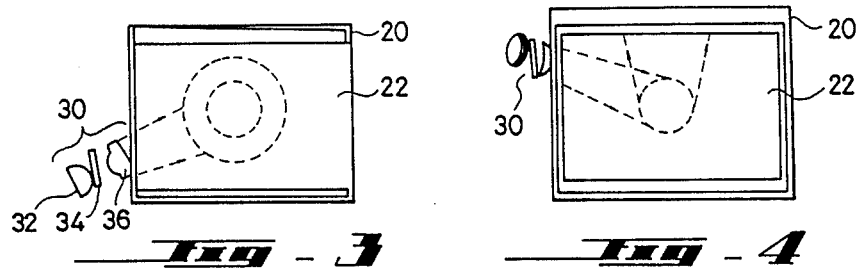
FIG. 3 is a partial plan view of FIG. 1.
FIG. 4 is a partial front elevational view of FIG. 1.

The mirror box 20 is provided on its left side wall, as viewed from the front, with a circular opening 28 which is located above the mirror 22 and which has therein an information projector 30. The information projector 30 has a light source 32, an imaging lens 36 and a transmission type liquid crystal substrate 34 which is located between the light source 32 and the imaging lens 36, as shown in FIG. 3.

The light source 32 of the preferred embodiment comprises a light-emitting diode (LED), however it is understood that other light sources can be used without departing from the scope of the invention. The wave length of the light source 32 is not limited to a special frequency. When the transmission type liquid crystal substrate 34 is activated, the light is transmitted only through a portion thereof corresponding to a letter or figure to be indicated, unlike a reflection type liquid crystal in which a portion corresponding to a letter or figure to be indicated is not transmissible when activated. In the illustrated embodiment, the transmission type liquid crystal substrate 34 comprises a number of liquid crystal elements held between transparent plates so that the liquid crystal elements are arranged so as to form a desired letter, figure, symbol etc., which represent the photographing information, such as the shutter speed, diaphragm value, focus conditions etc. The liquid crystal elements which are normally light-transmissible are converted to ones which intercept the light when a predetermined voltage is supplied thereto, so that the transmissible liquid crystal elements which are surrounded by the interceptive liquid crystal elements form a desired letter or figure etc.

The information projector 30 is opposite to the mirror 22 so that the flux of light which is transmitted through the transmission type liquid cyrstal substrate 34 passes through the imaging lens 36 and is reflected by the mirror 22, so that all the information of the liquid crystal substrate 34 is imaged onto the focusing glass 24.

Figure 7:
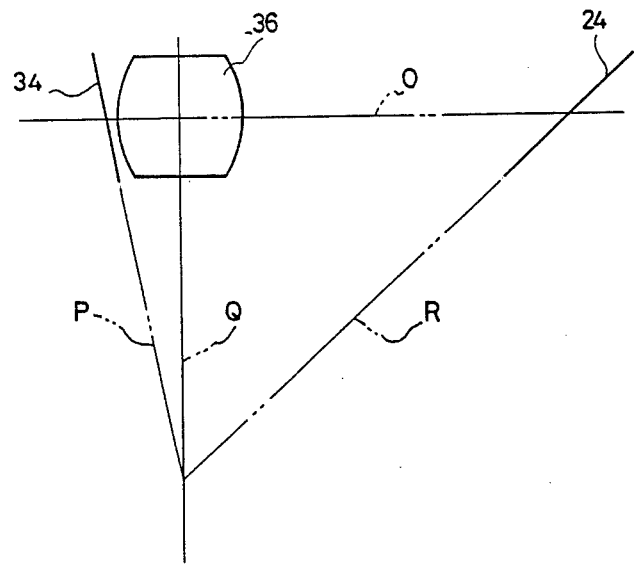
FIG. 7 is a schematic view showing a positional relationship between a transmission type liquid crystal substrate, an imaging lens and a focusing glass.
Figure 9:
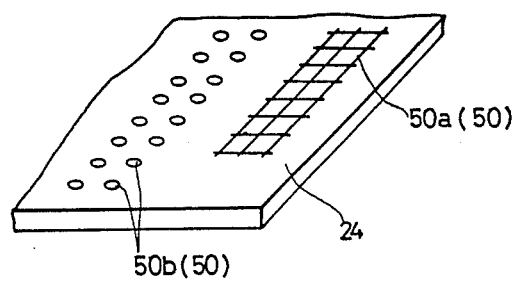

An extension plane P of the transmission type liquid crystal substrate 34, a plane Q which passes through the optical center of the imaging lens 36 and which intersects the optical axis O thereof, and an extension plane R of an imaging plane of the focusing glass 24 optically intersect at a line, as can be seen in FIG. 7.

Figure 6:
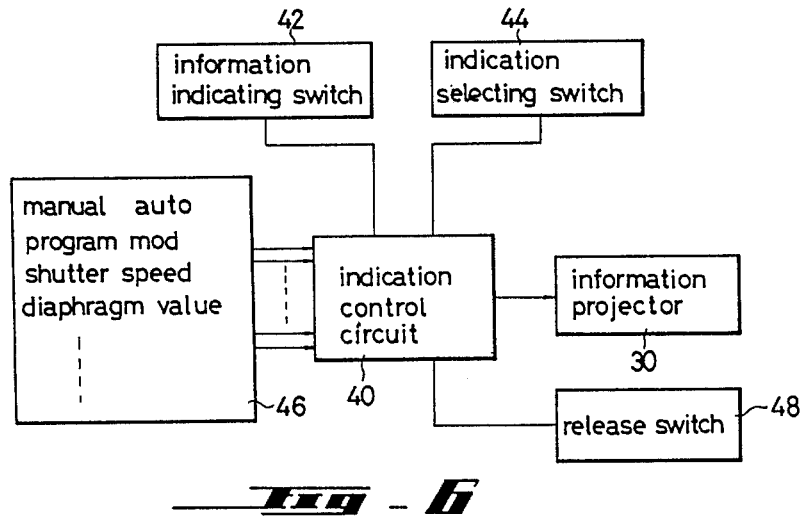
FIG. 6 is a block diagram of a control system of a camera shown in FIG. 1.

The information projector 30 is controlled by an indication control circuit 40, as shown in FIG. 6. Various photographing information 46, such as shutter speed, diaphragm value, focus condition, photographing mode (auto or manual program mode), the frame number of the film, etc. to be inputted to the transmission type liquid crystal substrate 34 are input to the indication control circuit 40. The indication control circuit 40 is actuated and controlled by an information indicating switch 42 and and indication selecting switch 44 both of which are provided on the camera body 10. The information projector 30 i.e. (the light source 32 and the transmission type liquid crystal substrate operates only when the information indicating switch 42 is in an ON position, so as to indicate the desired information in the center of the finder field of view. Information which is not indicated in the finder can be selectively indicated by operating the indication selecting switch 44. A release signal from a release switch 48 is provided to the indication control circuit 40, so that when an operational signal is given to a shutter (not shown), the light source 32 is turned OFF, regardless of the ON state of the information indicating switch 42, preventing the film being exposed by the light of the information projector 30.

Figure 5:
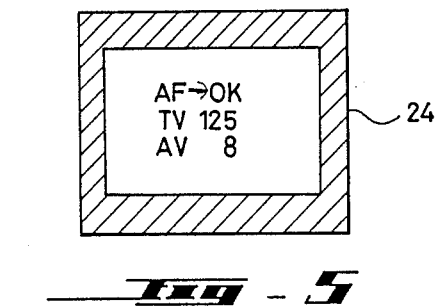
FIG. 5 is a front elevational view of a focusing glass shown in FIG. 1.

Since the image of the object to be photographed is also formed on the focusing glass 24, in addition to the above-mentioned information image, a photographer can simultaneously see both an image of the object and an image of the photographing information of a predetermined letter or figure of the transmission type liquid crystal substrate 34 in the finder field of view, as shown in FIG. 5. Note that in the focusing glass 24 in FIG. 5, "AF→OK" represents that the light is correctly focused onto the object to be photographed, "TV 125" indicates a shutter speed at 1/12 second, and "AV 8" indicates a diaphragm value of F8, respectively. When a photographer looks at the finder through the eye piece 16, he or she can see both the image of the photographing information and the image of the object, superimposed one on another.

When the shutter is released, the indication control circuit 40 receives an input signal from the release switch 48 to turn the light source 32 OFF.

Figure 8:
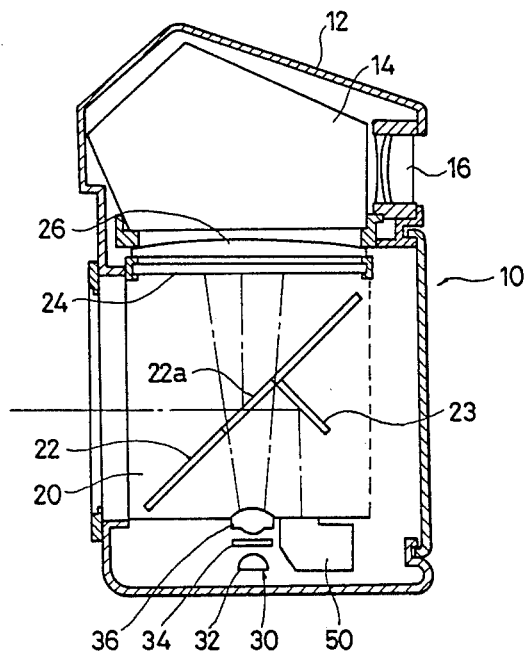
FIG. 8 is a longitudinal sectional view similar to FIG. 1, according to another embodiment of the present invention; and, FIG. 9 is a perspective view of fluorescent substances provided on the focusing glass by way of an example.

FIG. 8 shows another embodiment of the present invention, in which the elements corresponding to those in the first embodiment are designated with the same reference numerals.

The mirror 22 of the camera has a half mirror portion 22a at the center thereof. An auxiliary mirror 23 is provided on the rear face of the half mirror portion 22a. The mirror box 20 is provided on its bottom with a focus detector 52 of an automatic focusing device located at a position equivalent to the film plane, below the auxiliary mirror 23.

A part of the flux of light which is transmitted through the interchangeable lens from he object is incident upon the half mirror portion 22a, so that the light is partly reflected by the half mirror 22a and is partly transmitted therethrough. The reflected light is focused on the focusing glass 24 to form an image. The light which is transmitted through the half mirror portion 22a is reflected by the auxiliary mirror 23 to be incident upon the focus detector 52.

In front of the focus detector 52 (on the left side in FIG. 8) is provided the information projector 30' which is opposed to the half mirror portion 22a. The construction of the information projector 30' is substantially identical to that of the projector in the first embodiment mentioned above except that the liquid crystal substrate 34 is not inclined with respect to the optical axis of the imaging lens 36, in the second embodiment. Accordingly, the flux of light emitted from the information projector 30' is transmitted through the half mirror portion 22a to the focusing glass 24 to make images of the information. The information projector 30 is controlled by the indication control circuit 40 in the same way as that of the first embodiment.

In the second embodiment mentioned above, since the information projector 30' is opposite to and parallel with the focusing glass 24, the positioning of the information projector 30' can be easily effected.

In the first and second embodiments, when the object to be photographed is bright, a photographer may have difficulty in seeing the image of the information formed on the focusing glass 24. The simplest solution to this difficulty is to increase the quantity of the light from the light source 32. However, this solution has an adverse influence on the photographer's eyes and results in an increased electrical power consumption.

It is possible to use ultraviolet radiation as a light source and to coat the focusing glass 24 with a fluorescent substance 50 without increasing the quantity of light to eliminate the adverse influence on the photographer's eyes. The fluorescent substance makes it possible to obtain a clear image without increasing the quantity of light, even if the object to be photographed is relatively bright. Where the focusing glass 24 is coated with the fluorescent substance, the fluorescent substance 50 is preferably in the form of a fine pattern in a matrix arrangement 50a or in a dotted arrangement 50b so as not to decrease the transmissibility of the light from the object and to make a clear separation between the lightening portion and the non-lightening portion by the flux of light. Furthermore, in order to prevent the fluorescent substance from lightening when it receives the ultraviolet rays of natural light, it is preferable to provide a UV filter on the interchangeable lens. It is also preferable to provide a UV filter on the eye piece 16 to eliminate an adverse influence on the photographer's eyes.

With the modified embodiment, even if the quantity of light of the light source 32 is small, since the flourescent substance 50 brightly lightens, even an image of a bright object can be clearly distinguished from the information image.

Note that the aspect of the present invention is applicable to an electronic still camera (still video camera) so long as it is a single-lens reflex camera.

As can be seen from the foregoing, since the necessary information can be indicated in the center of the finder field of view, a photographer can confirm the desired information without moving his or her eyes away from the finder. Furthermore, according to the present invention, a photographer can see both the images of the necessary information and an object to be photographed at one time, thus resulting in the prevention of missing a photograph.

We claim:

1. An information indicating apparatus adapted for use in a single-lens reflex camera comprising a finder device in which rays of light, of an object to be photographed, are reflected by a mirror to form an image of said object on a focusing glass, said information indicating apparatus being located so as to project photographing information represented by a letter, or figure, or other symbol onto said focusing glass and to said finder device, an indication control circuit for controlling said photographing information to be indicated on said focusing glass, and an information indicating switch for turning said photographing information ON and OFF.

2. An information indicating apparatus according to claim 1, wherein said information indicating apparatus comprises a light source, a transmission type liquid crystal substrate located in front of said light source, and an imaging lens located in front of said transmission type liquid crystal substrate.

3. An information indicating apparatus according to claim 2, wherein said transmission type liquid crystal substrate is light-transmissible so that photographing information can be selectively indicated on said liquid crystal substrate.

4. An information indicating apparatus according to claim 3, wherein said transmission type liquid crystal substrate comprises a plurality of liquid crystal elements, so that when a predetermined voltage is applied to said predetermined liquid crystal elements, said transmissible type liquid crystal elements, which are surrounded by non-transmissible liquid crystal elements, represent a desired letter, figure or the like.

5. An information indicating apparatus according to claim 1, wherein said indication control circuit has an indication selecting switch which selects photographing information to be displayed.

6. An information indicating apparatus according to claim 1, further comprising a release switch which provides a release signal to said indication control circuit to turn said information indicating apparatus OFF, when a shutter is released, even when said information indicating switch is kept ON.

7. An information indicating apparatus according to claim 2, wherein said light source is an ultraviolet light source.

8. An information indicating apparatus according to claim 7, wherein said focusing glass is coated with a fluorescent substance that lightens when it receives ultraviolet rays.

9. An information indicating apparatus according to claim 7, wherein said fluorescent substance has a fine pattern arranged in a matrix arrangement.

10. An information indicating apparatus according to claim 7, wherein said fluorescent substance has a fine pattern arranged in a dotted arrangement.

11. An information indicating apparatus according to claim 1, further comprising a mirror box in which said mirror is located, wherein said information indicating apparatus is provided on a wall of said mirror box.

12. An information indicating apparatus according to claim 1, wherein said mirror comprises a half mirror portion.

13. An information indicating apparatus according to claim 12, wherein said information indicating apparatus is positioned on the bottom of said mirror box below said half mirror, so that said photographing information which is projected by said information indicating apparatus is transmitted through said half mirror so as to be focused onto said focusing glass.

14. An information indicating apparatus according to claim 11, said wall of said mirror box comprising a side wall opposite said mirror so that said photographing information projected by said information indicating apparatus is reflected by said mirror to be focused onto said focusing glass.

15. An information indicating apparatus adapted for use in a single-lens reflex camera comprising a mirror in which rays of light of an object to be photoghraphed are reflected to form an image of said object on a focusing glass, a finder device to observe an image focused on said focusing glass through said mirror, an information projecting apparatus to project photographing information in the form of a letter, a figure, or other symbol so that said photographing information is focused on said focusing glass through said mirror, an indication control circuit for controlling said photographing information to be indicated on said focusing glass, and an information indicating switch for turning said photographing information ON and OFF.

16. An information indicating apparatus adapted for use in a single-lens reflex camera comprising a finder device in which rays of light, of an object to be photographed, are reflected by a mirror to form an image of said object on a focusing glass, said information indicating apparatus adapted to project photographic information represented by a symbol onto said mirror and to said finder device, an indication control circuit for controlling said photographing information to be indicated on said focusing glass, and an information indicating switch for turning said photographing information ON and OFF.

* * * * *

UNITED STATES PATENT AND TRADEMARK OFFICE
CERTIFICATE OF CORRECTION

PATENT NO. : 4,949,118

DATED : August 14, 1990

INVENTOR(S) : Masato YAMAMOTO et al.

It is certified that error appears in the above-identified patent and that said Letters Patent is hereby corrected as shown below:

At column 1, line 8, before "the" insert ---as---;
At column 1, line 33, change "the indicator additional" to ---the additional indicator---; and
At column 1, line 37, before "not" change "ins" to ---is---.
At column 2, lines 32 and 33, change "mirror movable 22" to ---movable mirror 22---.
At column 3, line 34, after "the" delete "frame";
At column 3, line 42, after "substrate" insert ---34)---; and
At column 3, line 65, change "at 1/12" to ---of 1/125---.
At column 4, line 18, before "object" change "he" to ---the---.

Signed and Sealed this

Fourteenth Day of July, 1992

*Attest:*

DOUGLAS B. COMER

*Attesting Officer*          *Acting Commissioner of Patents and Trademarks*